United States Patent [19]

Schapira et al.

[11] 4,206,454

[45] Jun. 3, 1980

[54] TWO CHANNEL OPTICAL FLAME DETECTOR

[75] Inventors: Sergiu Schapira, Newton; Howard L. Tufts, Hingham, both of Mass.

[73] Assignee: Chloride Incorporated, Tampa, Fla.

[21] Appl. No.: 903,927

[22] Filed: May 8, 1978

[51] Int. Cl.² .......................... G01J 1/00; G08B 21/00

[52] U.S. Cl. .................................... 340/578; 250/339; 250/554; 340/600

[58] Field of Search ................ 340/578, 600; 250/338, 250/339, 340, 349, 554

[56] References Cited

U.S. PATENT DOCUMENTS

| | | | |
|---|---|---|---|
| 3,122,638 | 2/1964 | Steel et al. | 250/349 |
| 3,222,661 | 12/1965 | Vasel et al. | 340/578 |
| 3,539,804 | 11/1970 | Billetdeaux et al. | 250/339 |
| 3,716,717 | 2/1973 | Scheidweiler et al. | 250/554 |
| 3,931,521 | 1/1976 | Cinzori | 250/349 X |
| 3,967,255 | 6/1976 | Oliver et al. | 340/578 X |
| 4,101,767 | 7/1978 | Lennington et al. | 250/339 |
| 4,160,163 | 7/1979 | Nakauchi | 250/340 X |
| 4,160,164 | 7/1979 | Nakauchi | 250/339 |

*Primary Examiner*—John W. Caldwell, Sr.
*Assistant Examiner*—Joseph E. Nowicki
*Attorney, Agent, or Firm*—Robert E. Ross

[57] ABSTRACT

A flame detector which is capable of discriminating between hydrocarbon fires and background radiation produced by the sun, artificial light or black body radiation. Two radiation sensors are provided, each being responsive to separate known radiation peaks produced by a hydrocarbon fire. Logic circuitry is provided which produces an alarm signal only when the radiation received by each sensor is above a predetermined value, and when the radiation received by one specified sensor is greater than the radiation received by the other sensor.

6 Claims, 4 Drawing Figures

TWO CHANNEL OPTICAL FLAME DETECTOR

BACKGROUND OF THE INVENTION

The optical detection of hydrocarbon fires is often rendered difficult by the presence of background radiation, such as from the sun, from artificial light, or from a hot metallic body. Although detectors are known which can discriminate between fire radiation and solar radiation, so that the detector will not provide an alarm in response to solar radiation, such a detector is "blinded" by the solar radiation and will not respond to fire radiation while exposed to solar radiation.

It is known that hydrocarbon fires produce radiation with peaks at various wavelengths. Efforts have been made to utilize these peaks for detection of such fires; however, such detectors are susceptible to false alarms from solar or black body radiation, either of which may produce radiation of substantial intensity in the particular wavelengths to which the detector is responsive.

SUMMARY OF THE INVENTION

The flame detector described herein comprises two radiation sensors, each responsive to separate known radiation peaks produced by a hydrocarbon fire, and associated logic circuitry, which allows an alarm signal to be produced only when the radiation received by each sensor exceeds a predetermined value, and when the radiation received by one specified sensor is greater than the radiation received by the other sensor.

In a specific embodiment of the invention, the radiation sensors are photo-resistive devices having suitable filters, one sensor being responsive to radiation in a narrow band centered at a wavelength of about 4.3 microns, the other sensor being responsive to a narrow radiation band centered on a known hydrocarbon fire radiation peak of shorter wavelength, such as, for example, about 2.7 microns.

The logic circuitry allows an alarm signal only when the radiation received by each sensor is above a predetermined level, and only when the intensity of the radiation received by the 4.3 micron sensor is greater than the intensity of the radiation received by the other sensor.

DESCRIPTION OF THE ILLUSTRATED EMBODIMENT

Figure 1:
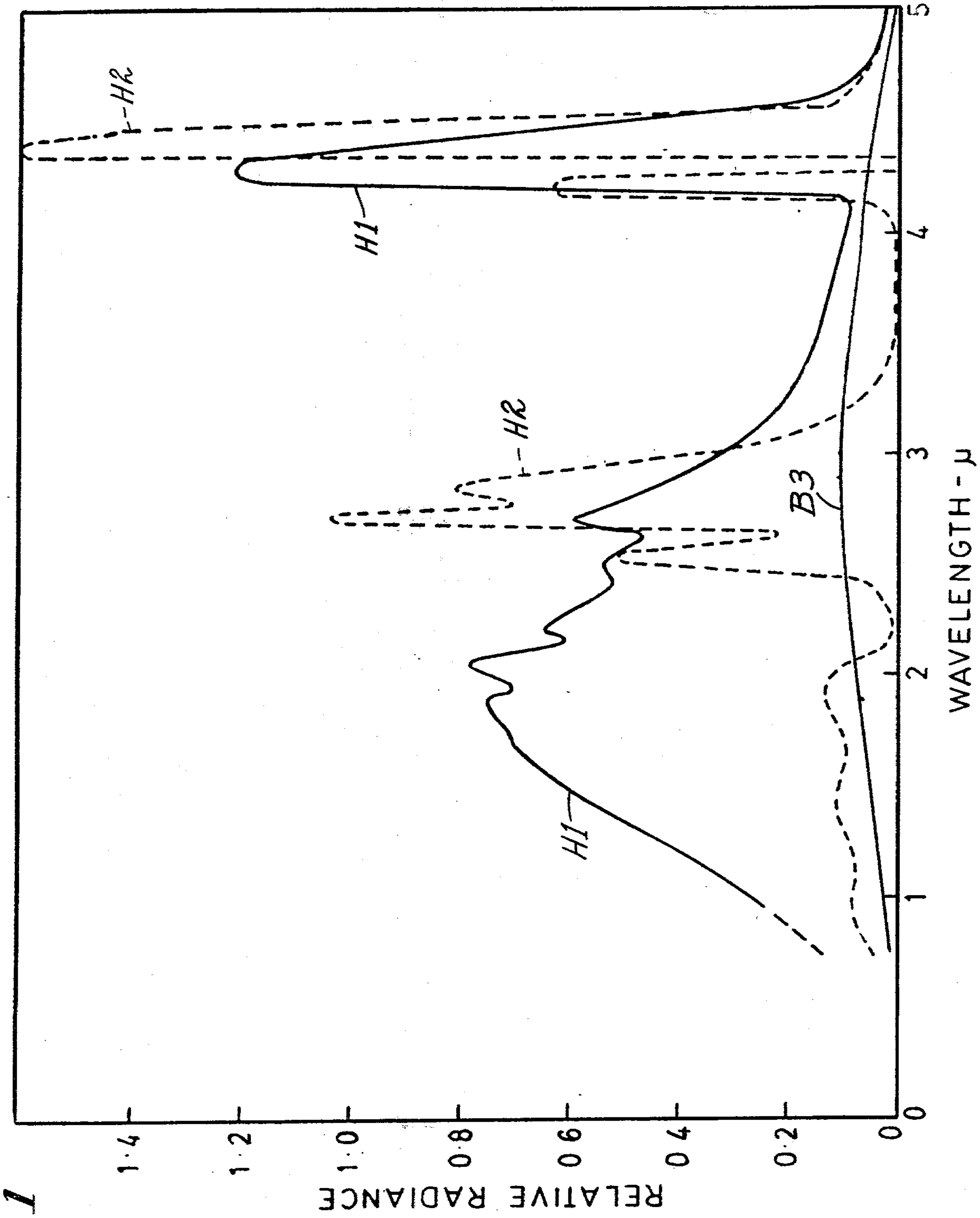
FIG. 1 is a graph showing radiation intensity plotted vs. wavelength, of radiation from hydrocarbon fires, and 1000° K. black body radiation.

Referring to FIG. 1, curve H1 is a graph on a logarithmic scale of radiation from a hydrocarbon diffusion flame, curve H2 is radiation from a hydrocarbon premixed flame, and curve B3 is the curve of 1000° K. black body radiation from FIG. 1, plotted on the same scale as the hydrocarbon flame curves.

Figure 2:
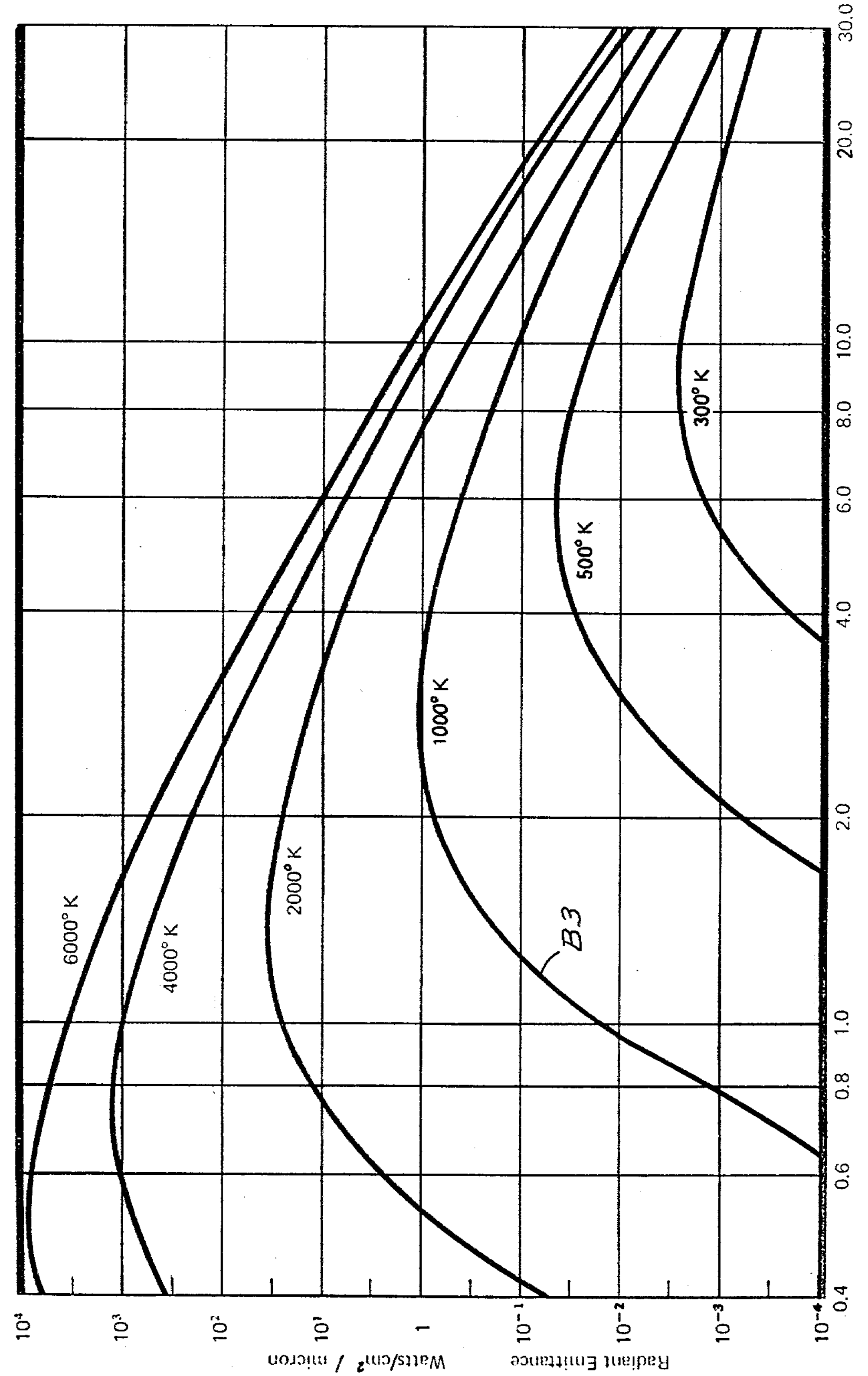
FIG. 2 is a graph of spectral radiant emittence of black bodies at various temperatures.

Referring to FIG. 2, there is illustrated graphs of black body radiation intensity vs. wavelength at various black body radiation temperatures.

Figure 3:
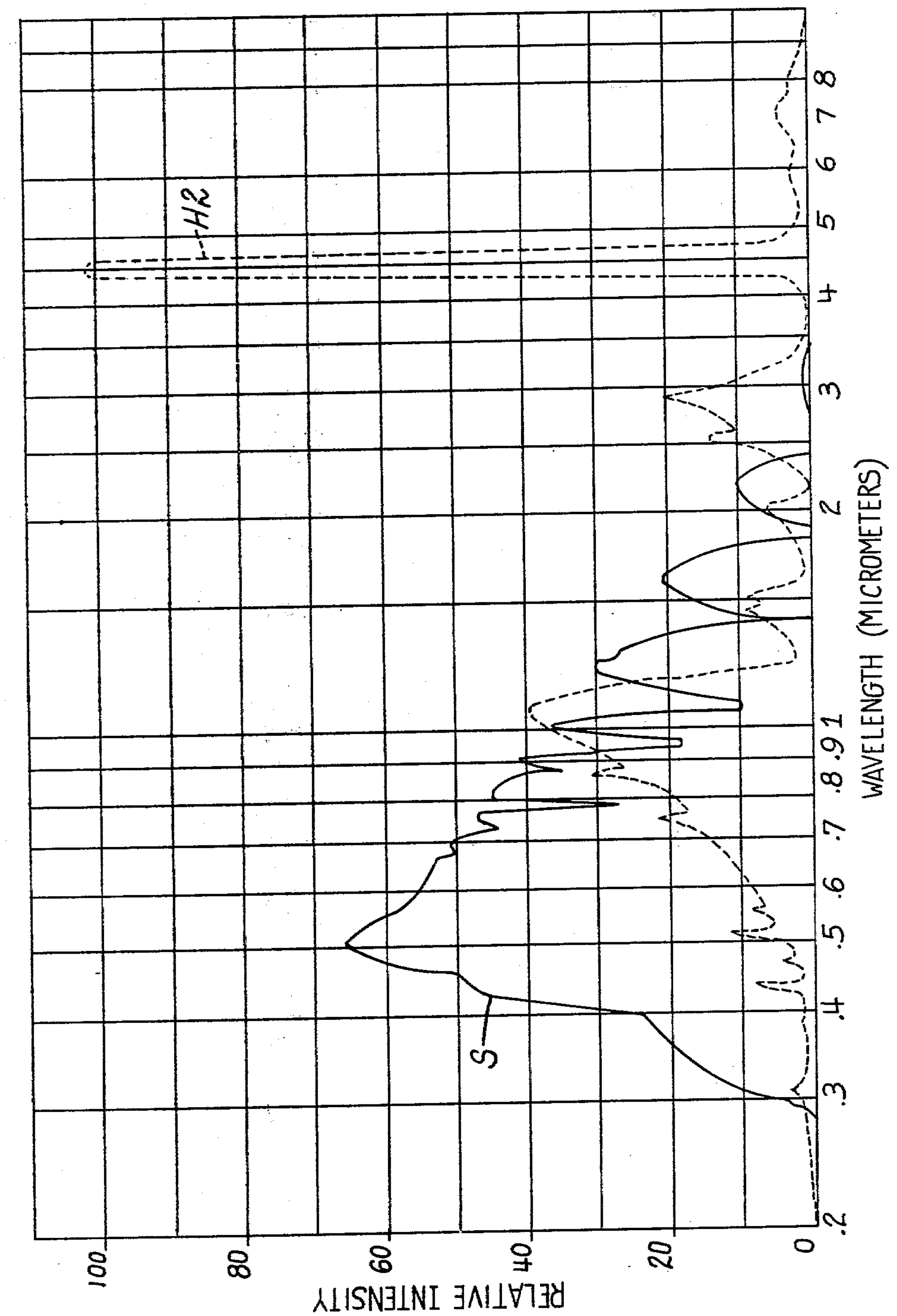
FIG. 3 is a graph of the relative intensity of radiation from a hydrocarbon flame and solar radiation at ground level.

Referring to FIG. 3, the graph H2 of relative intensity of radiation from a pre-mixed hydrocarbon flame is plotted on the same scale as graph S, the intensity of solar radiation at ground level.

It is seen from FIG. 2 that black body radiation from a 6000° K. source has a maximum intensity at a wavelength of about 0.5 microns, and that the wavelength of the maximum intensity increases (shifts to the right on the graph) as the temperature decreases. At any given source temperature the radiation intensity decreases from the maximum, in the direction of increasing wavelength, by a curve of substantially constant gradual slope without irregularities.

It is further seen that at any source temperature above about 1000° K. the intensity of the radiation at 4.3 microns is less than the intensity at 2.7 microns. Below about 1000° K., the maximum intensity of the radiation has shifted far enough to the longer wavelengths that the intensity at 4.3 microns is greater than the intensity at 2.7 microns.

Referring to FIG. 1, it is seen that a hydrocarbon fire, whether from a flame pre-mixed with air or a flame receiving air by diffusion, produces an irregular radiation curve with peaks at various wavelengths. For example, a hydrocarbon fire produces a peak at about 2.7 microns, and another at about 4.3 microns. The intensity of the 4.3 micron peak is substantially greater than the 2.7 micron peak.

FIG. 3 shows that a hydrocarbon fire produces radiation in both the 4.3 micron band and the 2.7 micron band, whereas no solar radiation in those bands reaches ground level which is completely attenuated by the atmosphere.

The detector described herein is designed to utilize the above-described radiation characteristics to provide a detector which is responsive to a hydrocarbon flame, but will not provide a false alarm in response to radiation from the sun, from a hot metallic body, or from artificial light.

Figure 4:
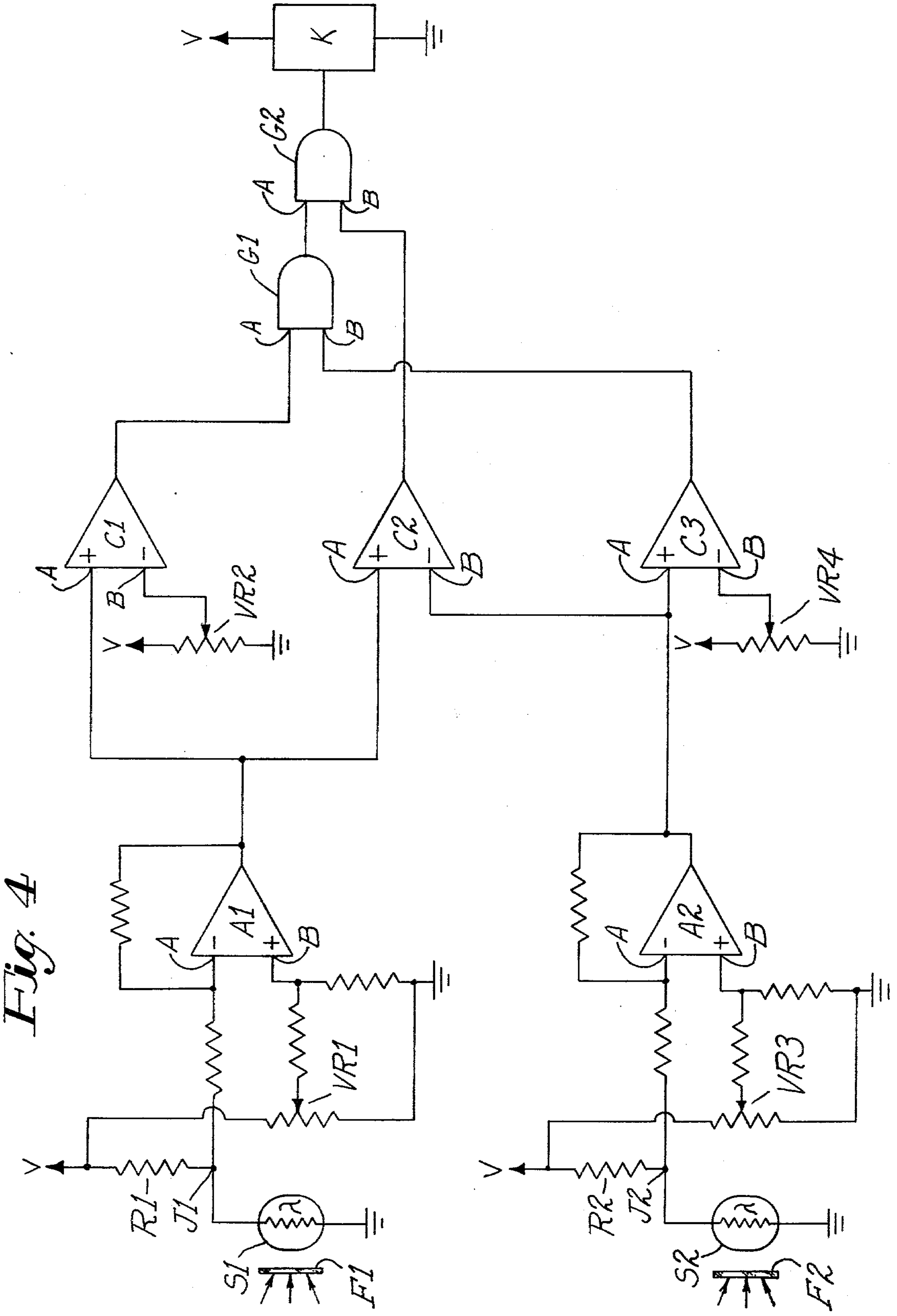
FIG. 4 is a schematic of an electrical and logic circuit of a flame detector embodying the features of the invention.

Referring to FIG. 4 there is shown a schematic diagram of an electronic detector and logic circuit embodying the features of the invention, which comprises a pair of sensors S1 and S2, which may be photo-resistive cells, with appropriate filters F1 and F2 to render each sensor responsive to different predetermined narrow frequency bands of radiation. In the specific embodiment of the invention being described, sensor S1 may be responsive to a narrow band of radiation centered at a wavelength of about 4.3 microns, and S2 may be sensitive to a narrow band of radiation centered at a wavelength of about 2.7 microns.

The exact physical structure of the sensors S1 and S2 does not form a part of the present invention, and may have any desired configuration for a particular application, such as shown in U.S. Pat. No. 3,188,593, or the sensors may be mounted in separate housings and positioned to have the same field of view.

The sensor S1 is connected in series with a resistor R1 across a power source V. The junction J1 between the resistor R1 and the sensor S1 is connected to a terminal A of a differential amplifier A1, the other terminal B of said amplifier being maintained at a predetermined voltage from the voltage source V through a suitable resistance network, which may contain a variable resistance VR-1. The output of differential amplifier A1 is connected to an input terminal A of a comparator C1 and an input terminal A of a comparator C2. Terminal B of comparator C1 is connected to the arm of variable resistor VR2, which is connected across the voltage source.

The sensor S2 is connected in series with a resistor R2 across the power source V through a junction J2, said junction being connected to a terminal A of a differential amplifier A2. The other terminal B of differential amplifier A2 is maintained at a predetermined voltage from the voltage source V by a suitable resistance network, which may contain a variable resistance VR-3. The output of differential amplifier A2 is connected to terminal B of comparator C2 and terminal A of comparator C3. Terminal B of comparator C3 is connected to the arm of variable resistor VR-4, which is connected across voltage source.

The output of comparators C1 and C3 respectively are connected to the two input terminals A and B of AND gate G1, and the output of AND gate G1 and the output of comparator C2, respectively, are connected to the two input terminals A and B of AND gate G2. The output of AND gate G2 is connected to alarm actuating means K.

The circuit of FIG. 4 causes an alarm in response to the viewing of a hydrocarbon fire by sensors S1 and S2, and prevents an alarm when the sensors view solar radiation or black body radiation at any temperature. Its operation will now be described.

To provide an alarm, three conditions must be met.

First, the intensity of radiation in the 4.3 micron band received by sensor S1 must reach a predetermined level, so that the output voltage of A1 appearing at terminal A of comparator C1 exceeds the reference voltage established by resistor VR-2 at terminal B thereof, so that an output from C1 appears at terminal A of AND gate G1.

Second, the intensity of radiation in the 2.7 micron band received by sensor S2 must reach another predetermined level, so that the output voltage of A2 appearing at terminal A of comparator C3 exceeds the reference voltage established by resistor VR-4 at terminal B thereof, so that an output from C3 appears at terminal B of AND gate G1. This input, with the input at terminal A of AND gate G1 initiated by sensor S1, provides an input at terminal A of AND gate G2.

To provide an output from AND gate G2 to alarm actuating means K, a signal must also be provided at terminal B of AND gate G2 from comparator C2. Comparator C2 is designed to provide an output only if the voltage at terminal A is greater than the voltage at terminal B.

In the illustrated embodiment of the invention, this condition is met only if the output voltage of amplifier A1 is greater than the output voltage of amplifier A2, which condition occurs only if the intensity of the radiation in the 4.3 micron band is greater than the radiation in the 2.7 micron band.

These three conditions are met only by radiation from a hydrocarbon flame, provided the reference levels established by comparators C1 and C3 are high enough, for reasons now to be described.

As seen in FIGS. 1 and 3, the intensity of radiation from a hydrocarbon flame in the 4.3 micron band is appreciably higher than that in the 2.7 micron band. This fact cannot by itself be used to discriminate against black body radiation, since black body radiation below about 1000° K. also has greater intensity of the 4.3 micron band than in the 2.7 micron band. Hence it is necessary to establish a minimum intensity of radiation required to be received by each sensor channel to produce the necessary output voltage from the associated differential amplifier (A1 or A2). In the illustrated embodiment of the invention, this may be established at 1000° K. for each sensor channel. As seen in FIG. 1, the intensity of radiation from a hydrocarbon fire in the 4.3 micron and 2.7 micron radiation bands is much higher than the radiation in those bands from a 1000° K. black body.

In the illustrated embodiment of the invention, the radiation level necessary to cause an alarm may be established by variable resistance VR-2 for the sensor S1 channel, and by variable resistance VR-4 for the sensor S2 channel, although it will be apparent to one skilled in the art that other means may be used for this purpose.

The amount by which the intensity of radiation received by sensor S1 must exceed the intensity of radiation received by sensor S2 to provide outputs from amplifiers A1 and A2 that will satisfy the requirements of comparator C2 may be controlled by the variable resistance VR-1 and VR-3.

The action of the circuit of FIG. 4 in preventing an alarm when exposed to radiation from other sources will now be described.

Referring to FIG. 2, it is seen that black body radiation from any source above 1000° K. having an intensity which is great enough in the 4.3 and 2.7 bands to cause an output from amplifier A1 and A2 higher than the voltage levels established at the B terminals of comparators C1 and C3, will cause an output from said comparators to appear at the terminals of AND gate G1, and hence an input signal appears at terminal A of AND gate G2.

However, the radiation from a black body with a temperature above 1000° K. has an intensity which is appreciably less at 4.3 microns than at 2.7 microns.

Hence the intensity of radiation from said sources seen by sensor S2 is greater than that seen by sensor S1 and therefore the resistance of S2 drops more than the resistance of S1. The voltage at J2 therefore drops more than the voltage at J1, and hence the difference between the inputs A and B of amplifier A2 is greater than the difference between the inputs A and B of amplifier A1, and hence the output of amplifier A2 is greater than that of A1. The voltage at terminal B of comparator C2 is therefore higher than the voltage at terminal A. The requirements of comparator C2 necessary to produce an output are therefore not satisfied, and no signal appears at terminal B of AND gate G2, and hence no output from gate G2 to the alarm circuit.

When radiation from a black body source below about 1000° K. is received, the intensity of the radiation in the 4.3 micron band is greater than that in the 2.7 micron band, so that the output from amplifier A1 is greater than that from amplifier A2. The voltage at terminal A of comparator C2 is therefore higher than the voltage at terminal B thereof, and an output is therefore produced by comparator C2 to terminal B of AND gate G2. However, the intensity of the radiation onto either sensor is not great enough to cause the resistance thereof to drop to a value low enough to allow the voltage at junctions J1 or J2 to drop to a value sufficient to cause an output from amplifier A1 or A2 to exceed the reference voltages of comparators C1 and C2, respectively.

Therefore no signal appears at either terminal of AND gate G1, and hence no signal appears at terminal A of AND gate G2, and no output appears from gate G2 to the alarm actuating device K.

The detector is immune to solar radiation at ground level, since the intensity of such radiation in both the 4.3 and 2.7 micron bands is substantially non-existent.

The detector is also immune to incandescent light, the radiation from which is substantially that of a black body at a temperature of 3000° K. or less, and is also immune to fluorescent light, which contains substantially no radiation in the red or infra-red bands.

Although optical flame detectors are known that do not produce a false alarm in response to solar radiation, such detectors are "blinded" by solar radiation, that is, when exposed to solar radiation they will not produce an alarm in response to radiation from a fire.

However, the presence of solar radiation does not affect the response of the present detector to fire radiation, since there is substantially no solar radiation in the frequency bands to which the detector is responsive.

Since changes apparent to one skilled in the art may be made in the above-described embodiment of the invention without departing from the scope thereof, it is intended that all matter contained herein be interpreted in an illustrative and not a limiting sense.

We claim:

1. A two channel optical detector for detecting radiation from a source which produces a plurality of spaced radiation peaks in the same wavelength band in which radiation is produced by a black body below 6000° K., said source producing a peak centered at one wavelength which is substantially more intense than peaks at shorter wavelengths, comprising a first optical detector substantially responsive to only the peak centered at said one wavelength, and a second optical detector substantially responsive to only a peak of lesser intensity centered on a shorter wavelength, and logic and electronic circuit means associated with said detectors which produces an output alarm only when the radiation received by each detector is above an intensity predetermined for each detector and the intensity of radiation received by the first detector is greater than the radiation received by the second detector.

2. A detector as set forth in claim 1 in which said first optical detector is responsive only to a narrow band of radiation centered on about 4.3 microns.

3. A detector as set forth in claim 2 in which said second optical detector is responsive only to a narrow band of radiation centered on about 2.7 microns.

4. A two channel optical detector for detecting radiation from a source which provides spaced radiation peaks in the same wavelength bands in which radiation is produced by a black body below 6000° K., comprising a first channel having a photo-responsive device with filter means rendering it responsive substantially only to radiation in a narrow band including 4.3 microns, a second channel having a photo-responsive device with filter means rendering it responsive substantially only to radiation in a narrow band including a wavelength substantially less than 4.3 microns, means providing an electrical output from each channel which is a function of the intensity of the radiation received thereby, means allowing each electrical output to produce first and second output signals only when the intensity of the radiation exceeds a predetermined value, means comparing said electrical outputs and allowing a third output signal only when the electrical output of the first channel is greater than that of the second channel, and means producing an output alarm signal only when the first, second, and third output signals exist simultaneously.

5. A two channel optical detector comprising a first photo-responsive device with associated optical filter means rendering it responsive by a change in electrical characteristics to radiation of a predetermined wavelength, and a second photo-responsive device with associated optical filter means rendering it responsive by a change in electrical characteristics to radiation of a substantially different wavelength than that to which the first channel is responsive, first and second amplifiers associated with said first and second photo-responsive devices, each amplifier producing an output which varies with the variations in electrical characteristics of the photo-responsive device with which it is associated, means associated with each amplifier to adjust the output produced therefrom by a specified radiation intensity, alarm actuating means requiring three simultaneous inputs to produce an alarm output signal, a level detector responsive only to an output of a predetermined level from the first amplifier to produce a first input to the alarm actuating means, a level detector responsive only to an output of a predetermined level from the second amplifier to produce a second input to the alarm actuating means, means comparing the amplifier outputs and producing a third input to the alarm actuating means only when one amplifier output is a predetermined amount greater than the other amplifier output.

6. An optical detector as set out in claim 5 in which means is provided at each level detector for adjusting the input signal level necessary to produce an output to the alarm actuating device.

* * * * *